(12) United States Patent
Tanaka et al.

(10) Patent No.: US 12,510,394 B2
(45) Date of Patent: Dec. 30, 2025

(54) LIFE DETERMINATION DEVICE AND LIFE DETERMINATION METHOD

(71) Applicant: TOYOTA JIDOSHA KABUSHIKI KAISHA, Toyota (JP)

(72) Inventors: Shogo Tanaka, Okazaki (JP); Ryo Kanda, Nisshin (JP); Seiji Kanda, Miyoshi (JP); Ryoko Tanaka, Toyota (JP); Takuma Endo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 322 days.

(21) Appl. No.: 18/467,471

(22) Filed: Sep. 14, 2023

(65) Prior Publication Data

US 2024/0200999 A1    Jun. 20, 2024

(30) Foreign Application Priority Data

Dec. 15, 2022    (JP) ................. 2022-200382

(51) Int. Cl.
*G01F 22/02* (2006.01)
*B60G 17/015* (2006.01)
*G07C 5/10* (2006.01)

(52) U.S. Cl.
CPC .......... *G01F 22/02* (2013.01); *B60G 17/0152* (2013.01); *G07C 5/10* (2013.01)

(58) Field of Classification Search
CPC .................. G01F 22/02; G07C 5/10
USPC ............................................. 73/149
See application file for complete search history.

(56) References Cited

U.S. PATENT DOCUMENTS

| 2005/0123483 A1 * | 6/2005 | Gamard | A61M 15/009 |
|---|---|---|---|
| | | | 128/200.23 |
| 2017/0151849 A1 | 6/2017 | Ohashi et al. | |

FOREIGN PATENT DOCUMENTS

| JP | 2008-189279 A | 8/2008 |
|---|---|---|
| JP | 2017-95028 A | 6/2017 |

* cited by examiner

*Primary Examiner* — Peter J Macchiarolo
*Assistant Examiner* — Rodney T Frank
(74) *Attorney, Agent, or Firm* — Sughrue Mion, PLLC

(57) ABSTRACT

An ECU is configured to determine the life of a pressure storage tank. The pressure storage tank has a gas chamber filled with gas, an oil chamber connected to a common passageway, and a piston dividing the gas chamber and the oil chamber. The pressure storage tank is configured to store hydraulic oil in the oil chamber and to release the hydraulic oil from the oil chamber. The ECU calculates a movement amount of the piston based on the volume change of the gas chamber. The ECU determines that the life of the pressure storage tank has ended when an integrated value of the calculated movement amount exceeds a threshold value.

4 Claims, 5 Drawing Sheets

LIFE DETERMINATION DEVICE AND LIFE DETERMINATION METHOD

TECHNICAL FIELD

This invention relates to a life determination device and a life determination method.

BACKGROUND ART

In the past, a pressure storage tank installed in a common passageway of a ride height adjustment system is known (see, for example, Patent Literature 1).

The pressure storage tank has a gas chamber filled with gas, an oil chamber connected to the common passageway, and a piston dividing the gas and oil chambers. The pressure storage tank is configured to store hydraulic oil in the oil chamber and to release the hydraulic oil from the oil chamber.

PRIOR ART LITERATURE

Patent Literature

[Patent Literature 1] JP2008-189279A

SUMMARY OF INVENTION

Problem to be Solved by Invention

Here, in order to use up the pressure storage tank properly, it is desirable to make it possible to determine the life of the pressure storage tank.

The present invention was made to solve the above problem, and the purpose of the invention is to provide a life determining device and a life determining method capable of determining the life of a pressure storage tank.

Means for Solving Problem

A life determination device according to the present invention determines a life of a pressure storage tank. The pressure storage tank has a gas chamber filled with gas, an oil chamber connected to an oil path, and a piston that divides the gas chamber and the oil chamber. The pressure storage tank is configured to store hydraulic oil in the oil chamber and to release the hydraulic oil from the oil chamber. The life determination device has a movement amount calculation section and a life determination section. The movement amount calculation section calculates a movement amount of the piston based on a volume change of the gas chamber. The life determination section determines that the life of the pressure storage tank has ended when an integrated value of the movement amount calculated by the movement amount calculation section exceeds a threshold value.

By this configuration, the life of the pressure storage tank can be determined based on the amount of piston movement.

The above life determination device may be provided with a volume change calculation section that calculates the volume change of the gas chamber. The volume change calculation section may be configured to calculate the volume change of the gas chamber based on a temperature of the gas chamber before pressure storage, a pressure of the gas chamber before pressure storage, a temperature of the gas chamber after pressure storage, and a pressure of the gas chamber after pressure storage.

In this case, the oil path may be a common passageway of a ride height adjustment system, and the common passageway may be provided with a temperature sensor to detect a temperature of the hydraulic oil and a pressure sensor to detect a pressure of the hydraulic oil. The temperature of the gas chamber may be estimated based on a detection result of the temperature sensor, and the pressure of the gas chamber may be estimated based on a detection result of the pressure sensor.

A life determination method according to the present invention is to determine a life of the pressure storage tank. The pressure storage tank has a gas chamber filled with gas, an oil chamber connected to an oil path, and a piston that divides the gas chamber and the oil chamber. The pressure storage tank is configured to store hydraulic oil in the oil chamber and to release the hydraulic oil from the oil chamber. The life determination method has the steps of calculating an amount of movement of the piston based on a volume change of the gas chamber, and determining that the life of the pressure storage tank has ended when an integrated value of the calculated amount of movement exceeds a threshold value.

Advantageous Effects of Invention

According to the life determination device and the life determination method of the present invention, the life of the pressure storage tank can be determined.

DESCRIPTION OF EMBODIMENTS

One embodiment of the invention is described below.

First, the configuration of a ride height adjustment system 100 to which an ECU 4 according to one embodiment of the invention is applied will be described.

Figure 1:
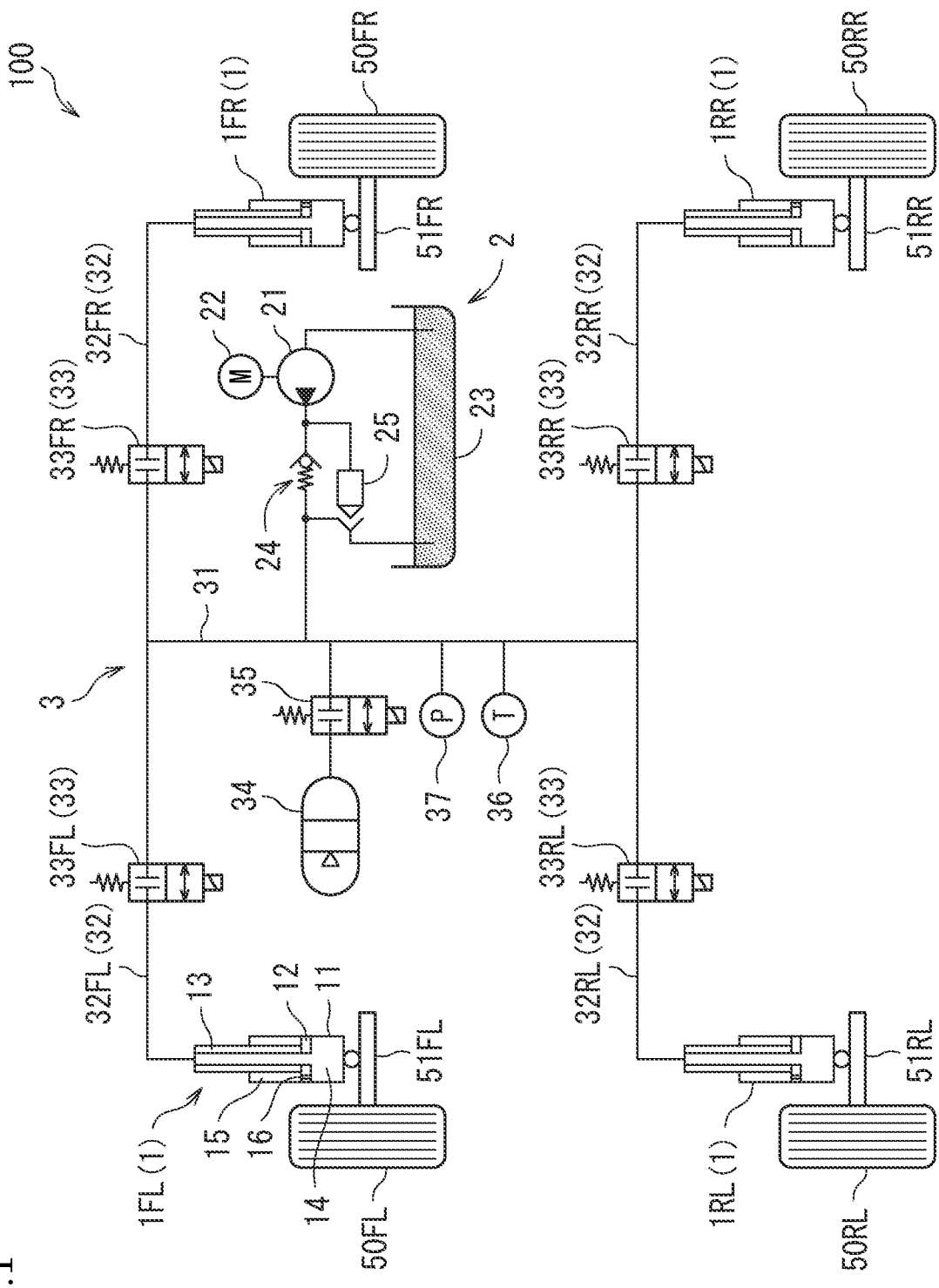
FIG. 1 is a schematic diagram of a ride height adjustment system in the present embodiment.

The ride height adjustment system 100 is configured to adjust the height position of a vehicle body (not shown) relative to wheels in a vehicle. As shown in FIG. 1, the wheels include a left front wheel 50FL, a right front wheel 50FR, a left rear wheel 50RL, and a right rear wheel 50RR. The front wheel 50FL is rotatably held by a front wheel retaining member 51FL, the front wheel 50FR is rotatably held by a front wheel retaining member 51FR, the rear wheel 50RL is rotatably held by a rear wheel retaining member 51RL, and the rear wheel 50RR is rotatably held by a rear wheel retaining member 51RR.

Figure 4:
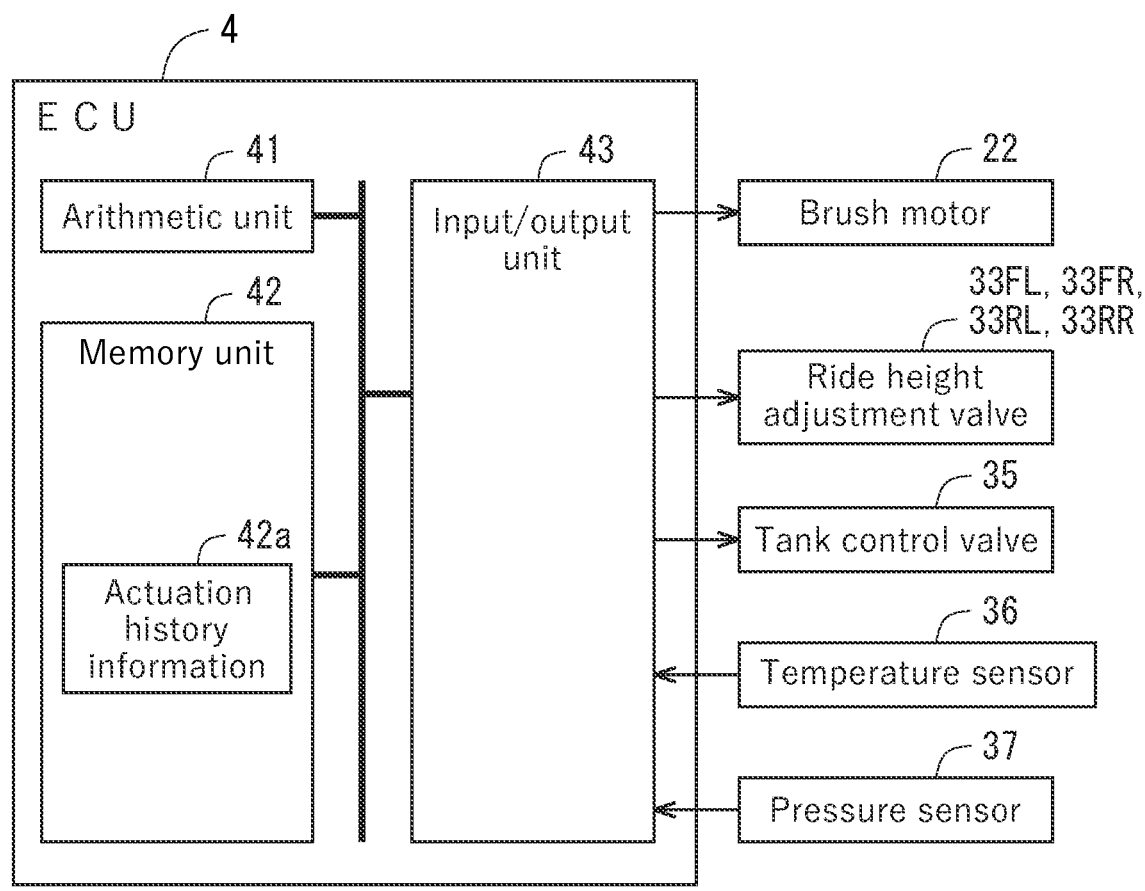
FIG. 4 is a block diagram showing an ECU of the ride height adjustment system of FIG. 1.

The ride height adjustment system 100 has four hydraulic cylinders 1, a hydraulic oil feed/discharge unit 2, a hydraulic circuit 3, and an ECU 4 (see FIG. 4). The four hydraulic cylinders 1 include hydraulic cylinders 1FL, 1FR, 1RL and 1RR. The ECU 4 is an example of a "life determination device" of the present invention.

The hydraulic cylinder 1FL is provided between the front wheel retaining member 51FL and the vehicle body. The hydraulic cylinder 1FL functions as a shock absorber. The hydraulic cylinder 1FL is configured to adjust the distance between the front wheel retainer 51FL and the vehicle body by extending and retracting. A suspension spring (not shown) is provided in parallel with the hydraulic cylinder 1FL between the front wheel retaining member 51FL and the vehicle body.

Specifically, the hydraulic cylinder 1FL includes a housing 11, a piston 12, and a piston rod 13. The housing 11 has an interior space, the piston 12 is movably housed in the interior space, and the piston rod 13 is connected to the piston 12. The housing 11 is connected to the front wheel retaining member 51FL, and the piston rod 13 is connected to the vehicle body. The interior space of the housing 11 is partitioned by the piston 12 to form oil chambers 14 and 15. A communicating passage 16 is formed in the piston 12, and allows the oil chambers 14 and 15 to communicate with each other. A throttle is provided in the communicating passage 16. The hydraulic cylinder 1FL is thus configured to generate a damping force in accordance with the speed of movement of the piston 12 with respect to the housing 11.

The hydraulic cylinder 1FR is provided between the front wheel retaining member 51FR and the vehicle body. The hydraulic cylinder 1RL is provided between the rear wheel retaining member 51RL and the vehicle body. The hydraulic cylinder 1RR is provided between the rear wheel retaining member 51RR and the vehicle body. Other configurations of the hydraulic cylinders 1FR, 1RL and 1RR are similar to those of the hydraulic cylinder 1FL described above.

The hydraulic oil feed/discharge unit 2 is provided for feeding and discharging hydraulic oil to and from the four hydraulic cylinders 1 through the hydraulic circuit 3. The hydraulic oil feed/discharge unit 2 includes an oil pump 21, a brush motor 22, a reservoir tank 23, a check valve 24, and a return valve 25.

The reservoir tank 23 stores hydraulic oil. The oil pump 21 is provided to pump the hydraulic oil from the reservoir tank 23 and supply it to a common passageway 31 described below in the hydraulic circuit 3. The brush motor 22 is the power source of the oil pump 21 and is provided to operate the oil pump 21. The brush motor 22 is a motor that operates by a mechanical mechanism using brushes and commutators. The check valve 24 and the return valve 25 are located in parallel on the discharge port side of the oil pump 21.

The check valve 24 is configured to allow a flow of hydraulic oil from the oil pump 21 to the common passage 31 and to prevent a flow of hydraulic oil from the common passageway 31 to the oil pump 21. The return valve 25 is provided to switch the supply of hydraulic oil from the oil pump 21 to the common passageway 31 and the discharge of hydraulic oil from the common passageway 31 to the reservoir tank 23. Specifically, when the oil pump 21 is stopped, the return valve 25 shuts off the discharge port side of the oil pump 21 from the common passageway 31, and allows the common passageway 31 to communicate with the reservoir tank 23. On the other hand, when the oil pump 21 is operating, the return valve 25 shuts off the reservoir tank 23 side from the common passageway 31, and allows the common passageway 31 to communicate with the discharge port side of the oil pump 21.

The hydraulic circuit 3 is provided between the four hydraulic cylinders 1 and the hydraulic oil feed/discharge unit 2. The hydraulic circuit 3 includes a common passageway 31, four individual passages 32, four ride height adjustment valves 33, a pressure storage tank 34, and a tank control valve 35. The four individual passages 32 have individual passages 32FL, 32FR, 32RL and 32RR. The four ride height adjustment valves 33 have ride height adjustment valves 33FL, 33FR, 33RL, and 33RR. The common passageway 31 is an example of an "oil path" of the present invention.

The common passageway 31 is located between the hydraulic oil feed/discharge unit 2 and the four individual passages 32. In other words, the common passageway 31 is connected to the hydraulic oil feed/discharge unit 2, and the four individual passages 32 branch from the common passageway 31. The common passageway 31 is provided with a temperature sensor 36 and a pressure sensor 37.

The individual passage 32FL is provided for connecting the hydraulic cylinder 1FL to the common passageway 31. The individual passage 32FL is provided with a ride height adjustment valve 33FL. The ride height adjustment valve 33FL is, for example, a normally closed electromagnetic open/close valve, and is provided to connect or shut off the hydraulic cylinder 1FL to/from the common passageway 31. The ride height adjustment valve 33FL is configured to open when hydraulic oil is fed to or discharged from the hydraulic cylinder 1FL.

The individual passage 32FR is provided for connecting the hydraulic cylinder 1FR to the common passageway 31. The individual passage 32FR is provided with a ride height adjustment valve 33FR. The ride height adjustment valve 33FR is, for example, a normally closed electromagnetic open/close valve, and is provided to connect or shut off the hydraulic cylinder 1FR to/from the common passageway 31. The ride height adjustment valve 33FR is configured to open when hydraulic oil is fed to or discharged from the hydraulic cylinder 1FR.

The individual passage 32RL is provided for connecting the hydraulic cylinder 1RL to the common passageway 31. The individual passage 32RL is provided with a ride height adjustment valve 33RL. The ride height adjustment valve 33RL is, for example, a normally closed electromagnetic open/close valve, and is provided to connect or shut off the hydraulic cylinder 1RL to/from the common passageway 31. The ride height adjustment valve 33RL is configured to open when hydraulic oil is fed to or discharged from the hydraulic cylinder 1RL.

The individual passage 32RR is provided for connecting the hydraulic cylinder 1RR to the common passageway 31. The individual passage 32RR is provided with a ride height adjustment valve 33RR. The ride height adjustment valve 33RR is, for example, a normally closed electromagnetic open/close valve, and is provided to connect or shut off the hydraulic cylinder 1RR to/from the common passageway 31. The ride height adjustment valve 33RR is configured to open when hydraulic oil is fed to or discharged from the hydraulic cylinder 1RR.

The pressure storage tank 34 is connected to the common passageway 31 via the tank control valve 35. The pressure storage tank 34 is designed to speed up the increase in vehicle height. The tank control valve 35 is, for example, a normally closed electromagnetic open/close valve, and is provided to connect or shut off the pressure storage tank 34 to/from the common passageway 31. The tank control valve 35 is configured to open when hydraulic oil is fed to or discharged from the pressure storage tank 34.

Figure 2:
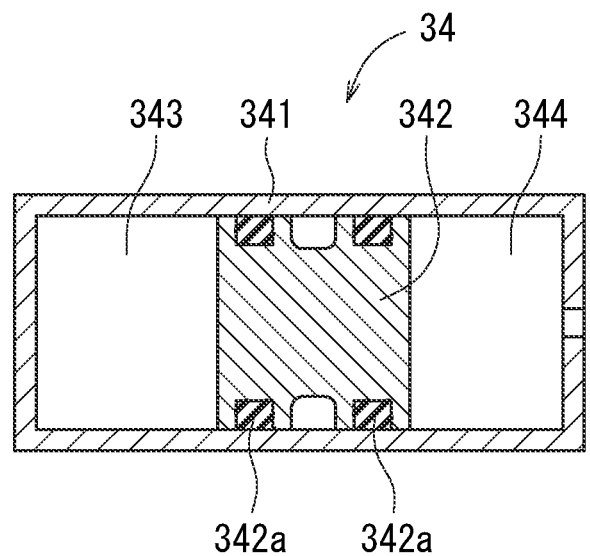
FIG. 2 is a cross-sectional view to illustrate a pressure storage tank of the ride height adjustment system of FIG. 1.

As shown in FIG. 2, the pressure storage tank 34 has a tank body 341 and a piston 342. The tank body 341 is cylindrical and has an interior space. The piston 342 is movably housed in the interior space of the tank body 341. The interior space of the tank body 341 is partitioned by the piston 342 to form a gas chamber 343 and an oil chamber 344. The gas chamber 343 is filled with gas (e.g., nitrogen gas). The oil chamber 344 is connected to the common passageway 31 via the tank control valve 35. Annular grooves are formed in the outer surface of the piston 342, and O-rings 342a are mounted in the annular grooves. The O-rings 342a are provided to seal the gap between the gas chamber 343 and the oil chamber 344.

The pressure storage tank 34 is configured to store hydraulic oil in the oil chamber 344 and to release the hydraulic oil from the oil chamber 344. When pressure is stored, the piston 342 is moved to one side (left side in FIG. 2), and when pressure is released, the piston 342 is moved to the other side (right side in FIG. 2).

As shown in FIG. 4, the ECU 4 includes an arithmetic unit 41, a memory unit 42, and an input/output unit 43. The memory unit 42 stores a program and other information for controlling the ride height adjustment system 100. The arithmetic unit 41 is configured to control the ride height adjustment system 100 by executing the program stored in the memory unit 42. Connected to the input/output unit 43 are the temperature sensor 36, the pressure sensor 37, a ride height sensor (not shown), the brush motor 22, the four ride height adjustment valves 33, and the tank control valve 35.

The temperature sensor 36 is provided to detect the temperature (oil temperature) of the hydraulic oil in the common passageway 31. The pressure sensor 37 is provided to detect the pressure (oil pressure) of the hydraulic oil in the common passageway 31. The ride height sensor is provided to detect the distance between the wheels and the vehicle body. The ECU 4 is configured to control the brush motor 22, the four ride height adjustment valves 33, and the tank control valve 35 based on inputs from the ride height sensor and other sensors.

—Ride Height Raising and Lowering Operation—

Next, an example of the height raising and lowering operation of the ride height adjustment system 100 will be described.

—When the Vehicle Height is Raised—

When the vehicle height is raised, the ECU 4 drives the brush motor 22 and operates the oil pump 21. In addition, the ECU 4 opens the tank control valve 35 and the four ride height adjustment valves 33. Thus, the hydraulic oil discharged from at least one of the oil pump 21 and the pressure storage tank 34 is supplied to the four hydraulic cylinders 1 via the hydraulic circuit 3. This causes the four hydraulic cylinders 1 to extend to increase the vehicle height. When the vehicle height reaches a target value, the ECU 4 then closes the four ride height adjustment valves 33.

The hydraulic oil discharged from the oil pump 21 is then supplied to the pressure storage tank 34 via the common passageway 31. When the oil pressure in the pressure storage tank 34 reaches a target value, the tank control valve 35 is closed by the ECU 4 and the oil pump 21 is deactivated.

—When the Vehicle Height is Lowered—

When the vehicle height is lowered, the ECU 4 opens the four ride height adjustment valves 33 while the oil pump 21 is stopped. As a result, the hydraulic oil from the four hydraulic cylinders 1 is returned to the reservoir tank 23 via the hydraulic circuit 3 and return valve 25. This causes the four hydraulic cylinders 1 to contract to lower the vehicle height. When the vehicle height reaches a target value, the ECU 4 then closes the four ride height adjustment valves 33.

—Determination of the Life of the Pressure Storage Tank—

In the pressure storage tank 34, the O-rings 342a slide and wear during the movement of the piston 342. Therefore, the O-rings 342a tend to deteriorate in the pressure storage tank 34. Therefore, the ECU 4 is configured to estimate the degree of deterioration of the O-rings 342a and determine the life of the pressure storage tank 34.

The ECU 4 is configured to calculate the volume change $\Delta V$ of the gas chamber 343 during pressure storage. The ECU 4 is also configured to calculate the movement amount AM of the piston 342 during pressure storage based on the volume change $\Delta V$ of the gas chamber 343. Further, the ECU 4 is configured to determine the life of the pressure storage tank 34 based on an integrated value of the calculated movement amount AM. The "volume change calculation section," "movement amount calculation section," and "life determination section" of the present invention are realized when the program stored in the memory unit 42 is executed by the arithmetic unit 41.

Figure 3:
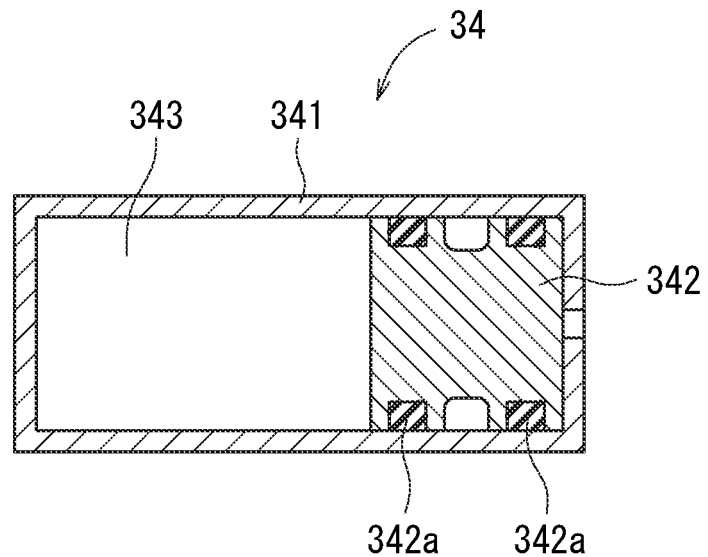
FIG. 3 shows the initial state of the pressure storage tank in FIG. 2.

Specifically, information about the pressure storage tank 34 is stored in the memory unit 42 of the ECU 4. The information about the pressure storage tank 34 includes a volume Vi, a pressure Pi, a temperature Ti, and a piston area AP. The volume Vi is the volume of the gas chamber 343 when the pressure storage tank 34 is in its initial state. The pressure Pi is the pressure of the gas chamber 343 when the pressure storage tank 34 is in its initial state. The temperature Ti is the temperature of the gas chamber 343 when the pressure storage tank 34 is in its initial state. The piston area AP is the pressure receiving area of the piston 342. The volume Vi, pressure Pi, temperature Ti, and piston area AP are preset values. When the pressure storage tank 34 is in its initial state, the piston 342 is positioned at the other end, as shown in FIG. 3.

The calculation of the volume change $\Delta V$ by the ECU 4 is performed using the following equation (1).

$$\Delta V = Vb - Va \quad (1)$$

In equation (1), Va is the volume of the gas chamber 343 after pressure storage, and Vb is the volume of the gas chamber 343 before pressure storage. The volume Va is calculated using equation (2) below, and the volume Vb is calculated using equation (3) below.

$$Va = (Pi \times Vi \times Ta)/(Ti \times Pa) \quad (2)$$

$$Vb = (Pi \times Vi \times Tb)/(Ti \times Pb) \quad (3)$$

In equation (2), Pa is the pressure of the gas chamber 343 after pressure storage, and Ta is the temperature of the gas chamber 343 after pressure storage. In equation (3), Pb is the pressure of the gas chamber 343 before pressure storage, and Tb is the temperature of the gas chamber 343 before pressure storage. The pressure Pa is estimated, for example, based on the detection result of the pressure sensor 37 after pressure storage. The temperature Ta is estimated, for example, based on the detection result of the temperature sensor 36 after pressure storage. The pressure Pb is estimated, for example, based on the detection result of the pressure sensor 37 before pressure storage. The temperature Tb is estimated, for example, based on the detection result of the temperature sensor 36 before pressure storage.

In equations (2) and (3), Vi is the volume of the gas chamber 343 in the initial state, Pi is the pressure of the gas chamber 343 in the initial state, and Ti is the temperature of the gas chamber 343 in the initial state. The volume Vi, pressure Pi and temperature Ti are stored in advance in the memory unit 42.

The calculation of the movement amount AM by the ECU 4 is performed using the following equation (4).

$$AM = \Delta V / AP \quad (4)$$

In equation (4), $\Delta V$ is the volume change of the gas chamber 343 before and after pressure storage, and AP is the pressure-receiving area of the piston 342. The volume change $\Delta V$ is calculated using equation (1). The piston area AP is stored in advance in the memory unit 42.

Actuation history information 42a is also stored in the memory unit 42. In the actuation history information 42a, the calculated movement amount AM is stored. That is, each time pressure storage is performed, the movement amount AM is stored in the actuation history information 42a. The ECU 4 is configured to judge that the life of the pressure storage tank 34 has come to an end when the integrated value of the amount of movement AM exceeds a threshold value. This threshold value is a predetermined value based on experiments, simulations, etc.

—Actuation History Accumulation Operation—

Figure 5:
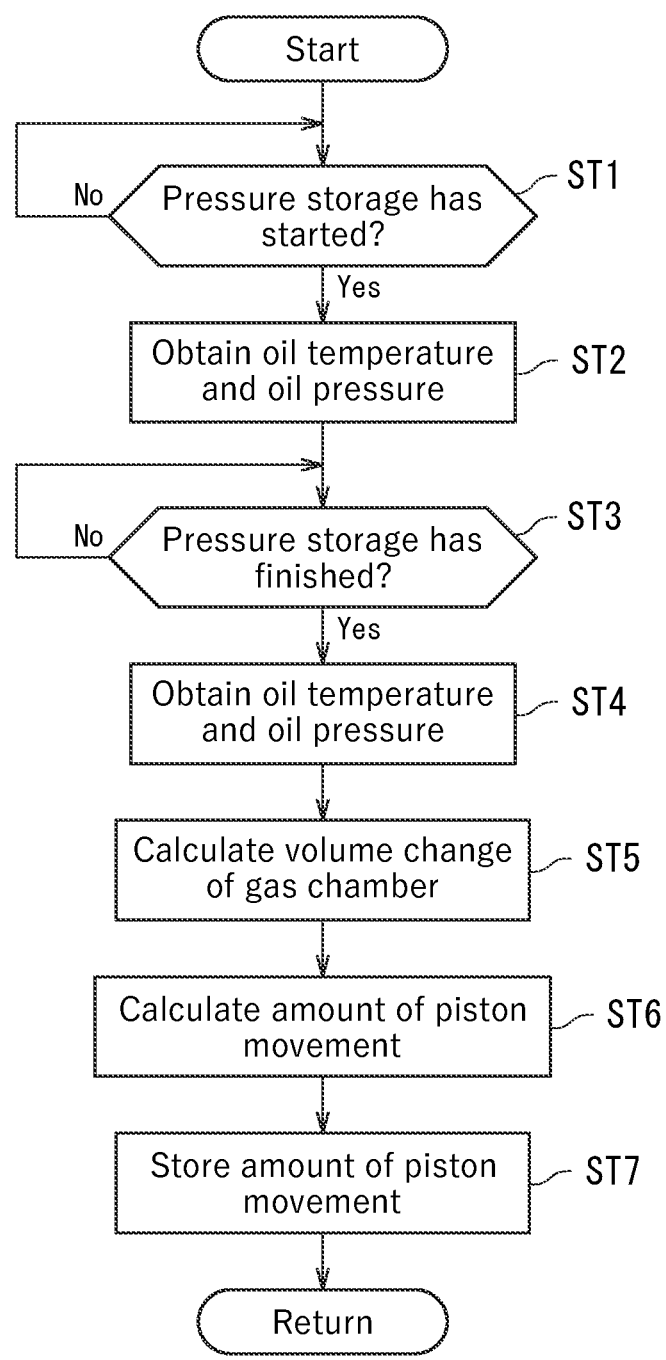
FIG. 5 is a flowchart to explain the operation of accumulating an actuation history of the pressure storage tank by the ECU in FIG. 4.

Next, with reference to FIG. 5, the operation of accumulating an actuation history of the pressure storage tank 34 by the ECU 4 is explained.

First, in step ST1 of FIG. 5, the ECU 4 determines whether or not pressure storage in the pressure storage tank 34 has started. Whether or not the pressure storage has started is determined based on, for example, the detection result of the pressure sensor 37. If the ECU 4 judges that the pressure storage has started, the process moves to step ST2. On the other hand, if the ECU 4 judges that the pressure storage has not started, step ST1 is repeated. In other words, the process waits until pressure storage is started.

Next, in step ST2, the oil temperature and oil pressure are obtained by the ECU 4 using the temperature sensor 36 and pressure sensor 37. Based on the oil temperature, the temperature Tb of the gas chamber 343 before pressure storage is estimated. Based on the oil pressure, the pressure Pb of the gas chamber 343 before pressure storage is estimated.

Next, in step ST3, the ECU 4 determines whether the pressure storage in the pressure storage tank 34 has been completed. Whether or not the pressure storage has been completed is determined based on, for example, the detection result of the pressure sensor 37. If the ECU 4 judges that the pressure storage has been completed, the process moves to step ST4. On the other hand, if the ECU 4 judges that the pressure storage has not been completed, step ST3 is repeated. In other words, if the pressure storage tank 34 is in the process of storing pressure, step ST3 is repeated. In other words, the process waits until the pressure storage is finished.

Next, in step ST4, the oil temperature and oil pressure are obtained by the ECU 4 using the temperature sensor 36 and pressure sensor 37. Based on this oil temperature, the temperature Ta of the gas chamber 343 after pressure storage is estimated. Based on the oil pressure, the pressure Pa of the gas chamber 343 after pressure storage is estimated.

Next, in step ST5, the volume change $\Delta V$ of the gas chamber 343 during pressure storage is calculated by the ECU 4. The volume change $\Delta V$ is calculated using the temperature Tb and pressure Pb estimated in step ST2 and the temperature Ta and pressure Pa estimated in step ST4. Specifically, the volume change $\Delta V$ is calculated based on equations (1) through (3) above.

Next, in step ST6, the amount of movement AM of the piston 342 during pressure storage is calculated by the ECU 4. The amount of movement AM is calculated using the volume change $\Delta V$ calculated in step ST5. Specifically, the amount of movement AM is calculated based on the above equation (4).

Next, in step ST7, the movement amount AM is stored in the actuation history information 42a by the ECU 4. The process then moves to return.

—Life Determination Operation—

Figure 6:
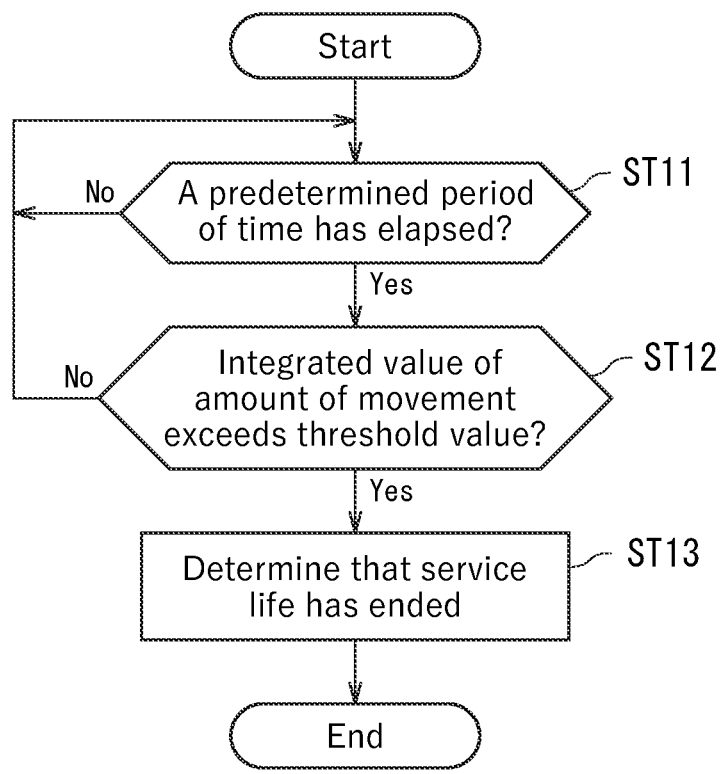
FIG. 6 is a flowchart to explain the operation of determining the life of the pressure storage tank by the ECU in FIG. 4.

Next, with reference to FIG. 6, the operation of the ECU 4 to determine the life of the pressure storage tank 34 is described.

First, in step ST11 of FIG. 6, the ECU 4 determines whether or not a predetermined period of time has elapsed. This predetermined period is a period of time to be set in advance, and is, for example, one day. If the ECU 4 determines that the predetermined period has elapsed, the process moves to step ST12. On the other hand, if the ECU 4 determines that the predetermined period has not elapsed, step ST11 is repeated. In other words, the process waits until the predetermined period of time has elapsed. In other words, step ST12 described below is performed every predetermined period of time.

Next, in step ST12, the ECU 4 determines whether the integrated value of the movement amount AM exceeds the threshold value. The integrated value of the movement amount AM is calculated based on the actuation history information 42a. In other words, the integrated value of the movement amount AM is an accumulated value of the movement amount AM that is calculated each time pressure storage is performed. If the ECU 4 determines that the integrated value of the movement amount AM exceeds the threshold value, the process moves to step ST13. On the other hand, if the ECU 4 determines that the integrated value of the movement amount AM does not exceed the threshold value, the process returns to step ST11.

In step ST13, the ECU 4 determines that the life of the pressure storage tank 34 has ended. In this case, the ECU 4 informs the user that the life of the pressure storage tank 34 has come to an end using a notification device, which is not shown in the figure. This makes it possible to urge the user to replace the pressure storage tank 34 that has reached the end of its service life.

—Effect—

In this embodiment, as described above, the movement amount AM of the piston 342 is calculated based on the volume change $\Delta V$ of the gas chamber 343, and the life of the pressure storage tank 34 is determined based on the integrated value of the movement amount AM. By this configuration, the life of the pressure storage tank 34 can be determined based on the amount of movement AM of the piston 342. Owing to the determination of the life of the pressure storage tank 34, the pressure storage tank 34 can be used up appropriately.

Further in this embodiment, the volume Va of the gas chamber 343 after pressure storage is calculated based on the pressure Pa of the gas chamber 343 after pressure storage and the temperature Ta of the gas chamber 343 after pressure storage. The volume Vb of the gas chamber 343 before pressure storage is calculated based on the pressure Pb of the gas chamber 343 before pressure storage and the temperature Tb of the gas chamber 343 before pressure storage. To calculate the volume change ΔV of the gas chamber 343, the volume Va of the gas chamber 343 after pressure storage is subtracted from the volume Vb of the gas chamber 343 before pressure storage. By this configuration, the volume change ΔV of the gas chamber 343 during pressure storage can be calculated.

Further in this embodiment, the temperature of the gas chamber 343 is estimated based on the detection result of the temperature sensor 36, and the pressure of the gas chamber 343 is estimated based on the detection result of the pressure sensor 37. By this configuration, the increase in the number of parts can be suppressed compared to the case where a temperature sensor detecting the temperature of the gas chamber is provided or a pressure sensor detecting the pressure of the gas chamber is provided.

OTHER EMBODIMENTS

The embodiment disclosed here is an example in all respects, and is not intended to be a basis for limiting interpretation. Therefore, the technical scope of the invention is not to be interpreted solely by the embodiment described above, but is to be defined based on the claims. The technical scope of the invention also includes all modifications within the meaning and scope equivalent to the claims.

For example, the above embodiment shows an example in which the life determination operation (see FIG. 6) is performed by the ECU 4. Not limited to this, the ECU may transmit the actuation history information to a server device (not shown), so that the life determination operation is performed by the server device.

The above embodiment also shows an example in which the movement amount AM of the piston 342 during pressure storage is accumulated. Not limited to this, the amount of movement of the piston during pressure storage and the amount of movement of the piston during pressure release may be accumulated.

The above embodiment also shows an example in which the temperature of the gas chamber 343 is estimated based on the detection result of the temperature sensor 36 and the pressure of the gas chamber 343 is estimated based on the detection result of the pressure sensor 37. Not limited to this, a temperature sensor may be provided to detect the temperature of the gas chamber, and a pressure sensor may be provided to detect the pressure of the gas chamber.

INDUSTRIAL APPLICABILITY

The present invention can be used for a life determination device and a life determination method for determining the life of a pressure storage tank.

What is claimed is:

1. A life determination device for determining a life of a pressure storage tank, wherein
the pressure storage tank has a gas chamber filled with gas, an oil chamber connected to an oil path, and a piston dividing the gas chamber and the oil chamber, and
the pressure storage tank is configured to store hydraulic oil in the oil chamber and to release the hydraulic oil from the oil chamber,
the life determination device comprising:
a movement amount calculation section that calculates a movement amount of the piston based on a volume change of the gas chamber; and
a life determination section determining that a life of the pressure storage tank has ended when an integrated value of the movement amount calculated by the movement amount calculation section exceeds a threshold value.

2. The life determination device according to claim 1, further comprising a volume change calculation section that calculates the volume change of the gas chamber,
the volume change calculation section being configured to calculate the volume change of the gas chamber based on a temperature of the gas chamber before pressure storage, a pressure of the gas chamber before pressure storage, a temperature of the gas chamber after pressure storage, and a pressure of the gas chamber after pressure storage.

3. The life determination device according to claim 2, wherein
the oil path is a common passageway of a ride height adjustment system,
the common passageway is provided with a temperature sensor to detect a temperature of the hydraulic oil and a pressure sensor to detect a pressure of the hydraulic oil,
the temperature of the gas chamber is estimated based on a detection result of the temperature sensor, and
the pressure of the gas chamber is estimated based on a detection result of the pressure sensor.

4. A life determination method for determining a life of a pressure storage tank, wherein
the pressure storage tank has a gas chamber filled with gas, an oil chamber connected to an oil path, and a piston dividing the gas chamber and the oil chamber, and
the pressure storage tank is configured to store hydraulic oil in the oil chamber and to release the hydraulic oil from the oil chamber,
the life determination method comprising the steps of:
calculating an amount of movement of the piston based on a volume change of the gas chamber; and
determining that the life of the pressure storage tank has ended when an integrated value of the calculated movement amount exceeds a threshold value.

* * * * *